(12) United States Patent
Dandu et al.

(10) Patent No.: US 11,368,359 B2
(45) Date of Patent: Jun. 21, 2022

(54) MONITORING REMOTE ZIGBEE® NETWORKS FROM THE CLOUD

(71) Applicant: Silicon Laboratories Inc., Austin, TX (US)

(72) Inventors: Bharat Raju Dandu, Medford, MA (US); Robert Alexander, Andover, MA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/066,819

(22) Filed: Oct. 9, 2020

(65) Prior Publication Data

US 2022/0116262 A1      Apr. 14, 2022

(51) Int. Cl.
*H04L 41/069*       (2022.01)
*G06F 11/07*         (2006.01)
*H04W 84/18*       (2009.01)

(52) U.S. Cl.
CPC .......... *H04L 41/069* (2013.01); *G06F 11/079* (2013.01); *G06F 11/0769* (2013.01); *H04W 84/18* (2013.01)

(58) Field of Classification Search
CPC .. H04L 41/069; G06F 11/0769; G06F 11/079; H04W 84/18
USPC .......................................................... 714/37
See application file for complete search history.

(56) References Cited

U.S. PATENT DOCUMENTS

2016/0255538 A1*   9/2016   Savarimuthu ....... H04L 67/1029
                                                                    370/329
2017/0251072 A1*   8/2017   Rinehart ................. H04L 67/42

OTHER PUBLICATIONS

Wikipedia "Debugger" page from date Sep. 30, 2020, retrieved from https://web.archive.org/web/20200930172945/https://en.wikipedia.org/wiki/Debugger (Year: 2020).*
Wikipedia "MBaaS" page from date Aug. 6, 2020, retrieved from https://web.archive.org/web/20200806083658/https://en.wikipedia.org/wiki/Mobile_backend_as_a_service (Year: 2020).*
Wikipedia "Debugger" page from date Dec. 5, 2016, retrieved from https://web.archive.org/web/20161205033216/https://en.wikipedia.org/wiki/Cloud_storage_gateway (Year: 2016).*
Wikipedia "Event viewer" page, retrieved from https://en.wikipedia.org/wiki/Event_Viewer (Year: 2022).*

* cited by examiner

*Primary Examiner* — Yair Leibovich
(74) *Attorney, Agent, or Firm* — Nields, Lemack & Frame, LLC (57) ABSTRACT

A system and method for remotely monitoring and analyzing devices on a wireless network, such as a ZIGBEE® network, is disclosed. The devices store event logs in a memory device whenever certain events occurs. These event logs are transmitted to a gateway device. The gateway device may operate in standalone mode or in network coprocessor (NCP) mode. The gateway device may then decode the event logs into a human readable output. This human readable output may then be uploaded to a server in the cloud, where further analysis of the human readable output may be performed. This information may then be retrieved by remote devices, such as smart phones. In other modes, the event logs are uploaded to the server in the cloud and the decoding is performed in the cloud.

18 Claims, 6 Drawing Sheets

MONITORING REMOTE ZIGBEE® NETWORKS FROM THE CLOUD

BACKGROUND

With the rapid growth of Internet of Things (IoT), ZIGBEE® devices are being used to sense and monitor various parameters. This need extends to home automation, agriculture, healthcare, and other fields.

As these ZIGBEE® networks grow in popularity, the ability to monitor the behavior of these ZIGBEE® networks is becoming more important. This includes the need to remotely monitor the behavior of these networks.

For example, currently, it is difficult to determine if a particular device, such as a sensor, is not functioning correctly, unless the operator directly queries the gateway or sensor. This may require the operator to be co-resident with the gateway or sensor. Further, for ZIGBEE® networks that are utilized in residential settings, often the expertise needed to monitor the network operation is not available.

Therefore, it would beneficial if there were a system and method to monitor the activities of these ZIGBEE® networks. Further, it would be advantageous if these activities could be viewed and analyzed remotely.

SUMMARY

A system and method for remotely monitoring and analyzing devices on a wireless network, such as a ZIGBEE® network, is disclosed. The devices store event logs in a memory device whenever certain events occurs. These event logs are transmitted to a gateway device. The gateway device may operate in standalone mode or in network coprocessor (NCP) mode. The gateway device may then decode the event logs into a human readable output. This human readable output may then be uploaded to a server in the cloud, where further analysis of the human readable output may be performed. This information may then be retrieved by remote devices, such as smart phones. In other modes, the event logs are uploaded to the server in the cloud and the decoding is performed in the cloud.

According to one embodiment, a method of remotely monitoring a network device disposed on a wireless network is disclosed. The method comprises storing, at the network device, an event log; transmitting the event log from the network device to a gateway device; receiving the event log at the gateway device; decoding the event log to create a human readable output; uploading the human readable output to a server in the cloud; and using a remote device in communication with the server, to access the human readable output. In certain embodiments, the server in the cloud performs analysis on the human readable output and makes a result of this analysis available to the remote device. In some embodiments, an event log is stored when the network device performs an action selected from the group consisting of: Reboot, Join network, Leave network, Trust center link key exchange, Channel change, Parent change, Child added, Child removed, and Network Security parameter changes. In certain embodiments, the wireless network comprises a ZIGBEE® network. In some embodiments, the event log is transmitted in a vendor unique packet having a special packet format referred to as a Diagnostic Information Data Object (DIDO). In some embodiments, a plurality of event logs are transmitted in the DIDO packet. In some embodiments, the gateway device is in NCP mode, wherein the gateway device is a network coprocessor in communication with a host computer, wherein the host computer decodes the event log and uploads the human readable output to the server. In some embodiments, the gateway device is in standalone mode, wherein the gateway device transmits the event logs to a local computer via a network interface different from a network interface used to receive the event log. In certain embodiments, the local computer decodes the event log. In certain embodiments, the local computer uploads the human readable output to the server. In certain embodiments, the network device stores the event logs in a ring buffer disposed in a memory device prior to transmitting to the gateway device.

According to another embodiment, a method of remotely monitoring a network device disposed on a wireless network is disclosed. The method comprises storing, at the network device, an event log; transmitting the event log from the network device to a gateway device; receiving the event log at the gateway device; uploading the event log to a server in the cloud; decoding the event log at the server in the cloud to create a human readable output; and using a remote device in communication with the server, to access the human readable output. In certain embodiments, the server in the cloud performs analysis on the human readable output and makes a result of this analysis available to the remote device. In some embodiments, an event log is stored when the network device performs an action selected from the group consisting of: Reboot, Join network, Leave network, Trust center link key exchange, Channel change, Parent change, Child added, Child removed, and Network Security parameter changes. In certain embodiments, the wireless network comprises a ZIGBEE® network. In some embodiments, the event log is transmitted in a vendor unique packet having a special packet format referred to as a Diagnostic Information Data Object (DIDO). In some embodiments, a plurality of event logs are transmitted in the DIDO packet.

According to another embodiment, a gateway device is disclosed. The gateway device comprises a first network interface to communicate with one or more ZIGBEE® devices; a second network interface to communicate with the internet; one or more processing units; one or more memory devices in communication with the one or more processing units; wherein the one or more memory devices comprise instructions, which when executed by the one or more processing units, enable the gateway device to: receive, using the first network interface, an event log from one or more ZIGBEE® devices; decode the event log to create a human readable output; and upload the human readable output to a server in the cloud. In certain embodiments, the gateway device operates in NCP mode, such that a host computer is in communication with one of the processing units, and wherein the host computer decodes the event log and uploads the human readable output to the server. In certain embodiments, the gateway device comprises a second network interface, and the gateway device uploads the human readable output to the server using the second network interface.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
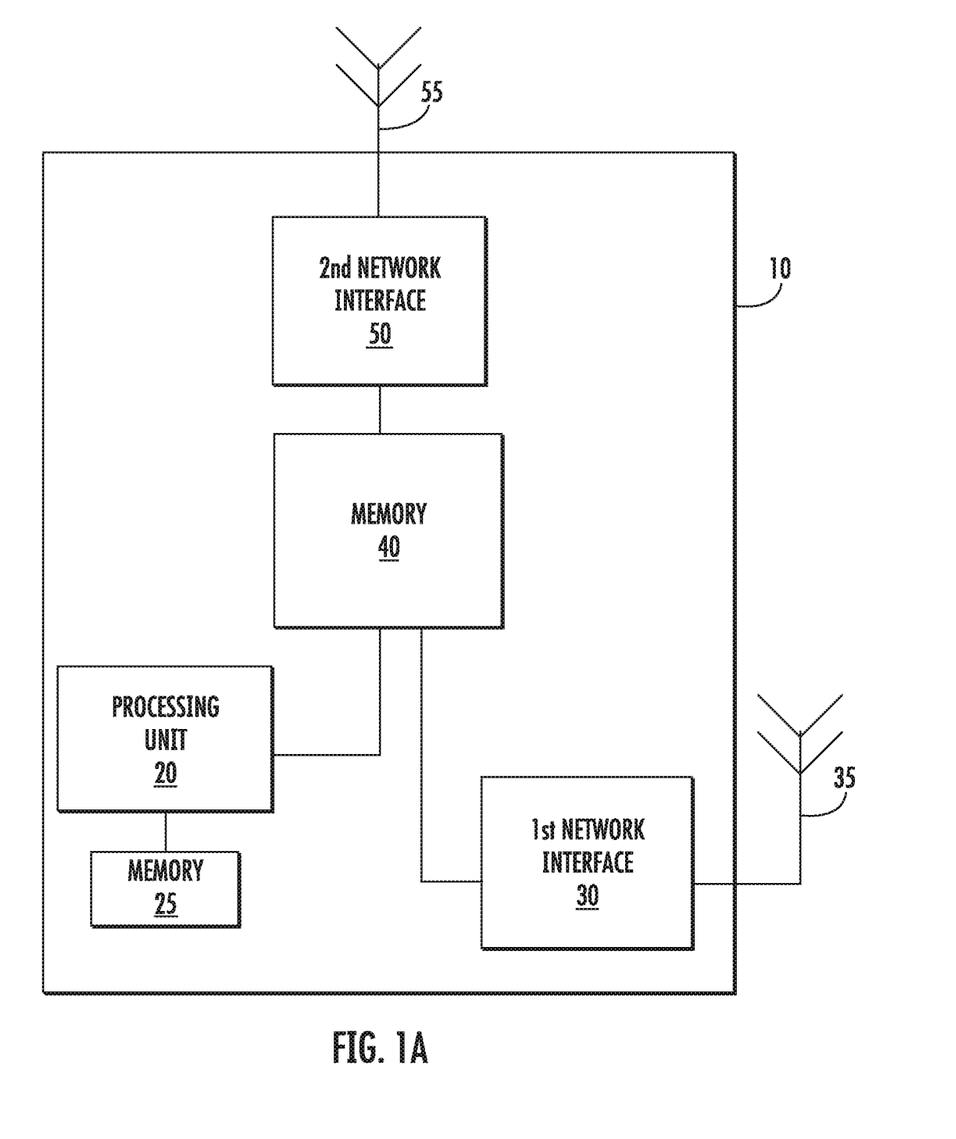
FIG. 1A is a block diagram of a gateway device according to one embodiment.

FIG. 1A shows a block diagram of a representative gateway device 10 according to a first embodiment.

The gateway device 10 has a processing unit 20 and an associated memory device 25. The processing unit 20 may be any suitable device, such as a microprocessor, an embedded controller, or an application specific device. The memory device 25 contains the instructions, which, when executed by the processing unit 20, enable the gateway device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The gateway device 10 may also include a first network interface 30. This first network interface 30 may support a wireless network, such as ZIGBEE® or another wireless network protocol. The first network interface 30 may include an antenna 35. The first network interface 30 is used to communicate with one or more devices that are part of the local wireless network, as shown in more detail in FIG. 2.

The gateway device 10 also includes a second network interface 50, which may be a wireless interface including an antenna 55. This second network interface 50 may be used to connect to the Internet. For example, in certain embodiments, the second network interface 50 may be an ethernet network controller. In other embodiments, the second network interface 50 may be a WIFI network controller. Further, while an antenna 55 is shown, in certain embodiments, the second network interface 50 may be a wired connection.

The gateway device 10 may include a second memory device 40 in which data that is received by the first network interface 30, and data that is to be transmitted by the first network interface 30, is stored. This second memory device 40 is traditionally a volatile memory. The processing unit 20 has the ability to read and write the second memory device 40 so as to communicate with the other nodes in the network.

Although not shown, the gateway device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the gateway device 10. The instructions contained on this second computer readable media may be downloaded onto the memory device 25 to allow execution of the instructions by the gateway device 10.

This configuration of the gateway device 10 may be referred to as the standalone mode. While FIG. 1A shows the components of the gateway device 10, it is understood that the gateway device 10 may be in communication with another system, such as a local computer 151 (see FIG. 2). This local computer 151 may be operating using Linux, Unix, MacOS, or any other suitable operating system. In certain embodiments, the gateway device 10 may utilize the local computer 151 to perform some of the functions described herein, such as data processing and/or transmission to the cloud 150.

Figure 1B:
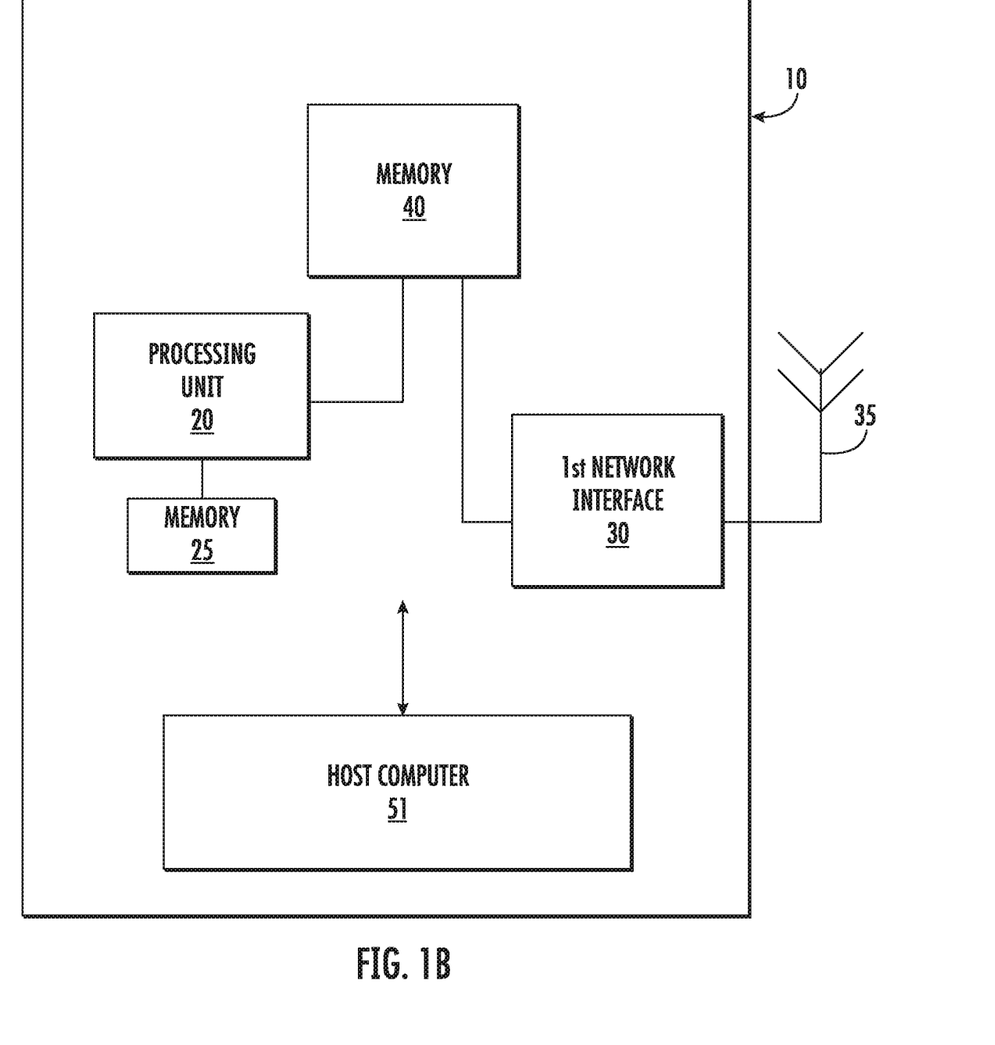
FIG. 1B is a block diagram of a gateway device according to a second embodiment.

FIG. 1B shows a block diagram of a representative gateway device 10 according to a second embodiment. In this embodiment, the gateway device 10 is implemented as a network coprocessor (NCP) in communication with a host computer 51. As such, the gateway device 10 comprises the first network interface 30, the antenna 35, the processing unit 20, the memory device 25 and the second memory device 40. However, communications with the internet may be provided by the host computer 51. Further, the host computer 51 also comprises a processing unit and a memory device in communication with that processing unit. The processing unit in the host computer 51 may be capable of performing some of the functions described herein, such as data processing and/or transmission to the cloud. This configuration may be referred to as the NCP mode.

Figure 2:
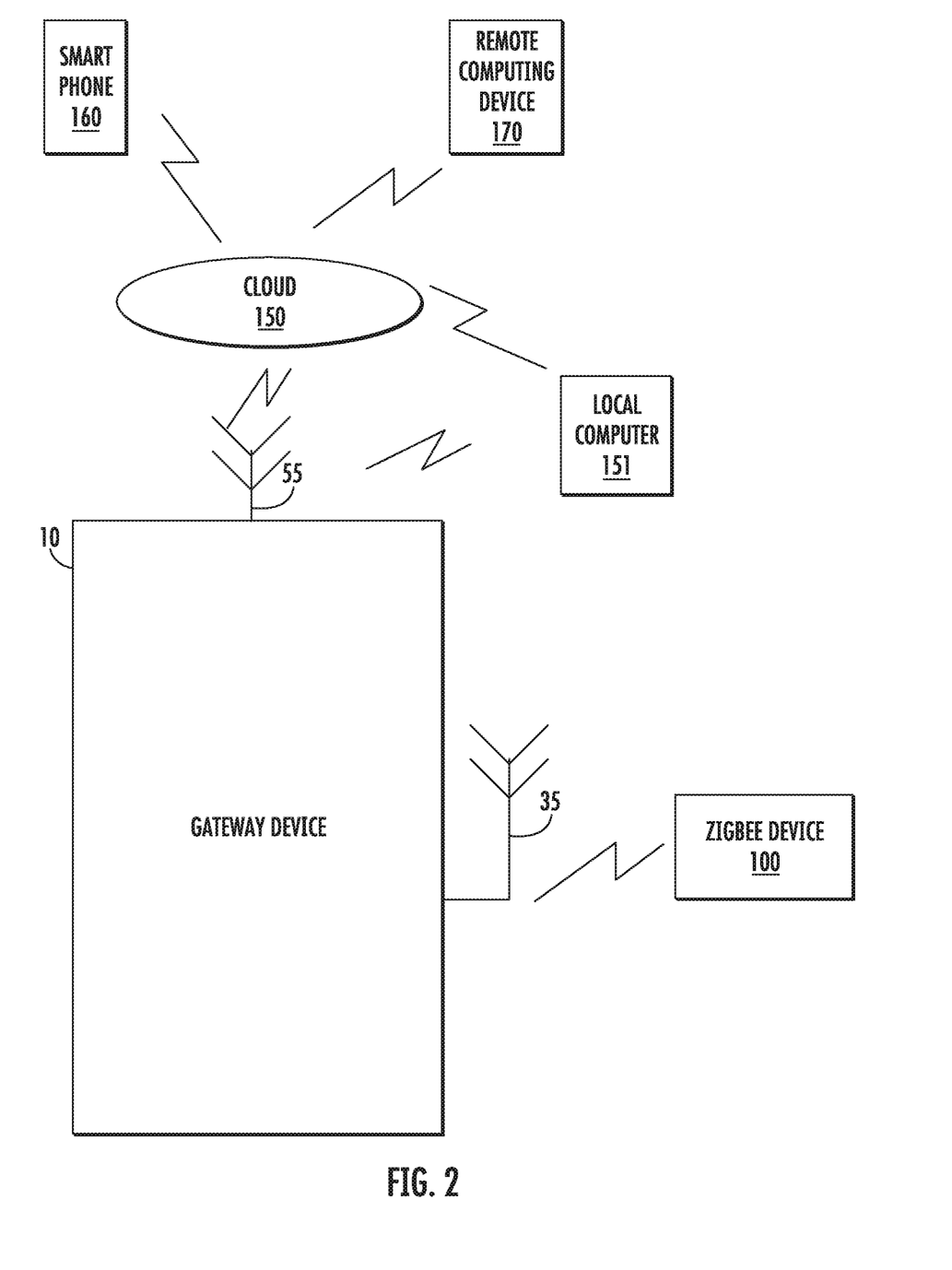
FIG. 2 shows the configuration of the gateway device of FIG. 1, a Zigbee® device and the cloud according to one implementation.

FIG. 2 shows the gateway device 10 in communication with a network device, such as a ZIGBEE® device 100. The gateway device 10 may be configured in either the standalone mode or the NCP mode. In both modes, the gateway device 10 communicates with the Zigbee network using first network interface 30 and antenna 35. The gateway device 10 and the ZIGBEE® device 100 may be part of a ZIGBEE® network. A ZIGBEE® network may comprise a coordinator, routers and end devices. A coordinator acts as the trust center or manager for the ZIGBEE® network which ensures security and authorization of other devices in the ZIGBEE® network. The coordinator is also designated to form the ZIGBEE® network. Routers provide routing capabilities and can be used as end devices and typically are always powered. The gateway device 10 may be a coordinator device or a router device of the ZIGBEE® network.

The gateway device 10 uses the existing ZIGBEE® standard to communicate with the ZIGBEE® device 100. As is well known, ZIGBEE® operates using the standard defined in IEEE 802.15.4. In other words, the IEEE 802.15.4 specification defines the physical and media access control layers of the network. The ZIGBEE® standard defines the higher level network protocols. The ZIGBEE® device 100 may be an end device or a sleepy device. The gateway device 10 serves as the parent node on the ZIBGBEE® network. The first network interface 30 of the gateway device 10 provides the hardware support to communicate to the ZIGBEE® device 100. While one ZIGBEE® device is shown, it is understood that there may be multiple ZIGBEE® devices, including routers, end devices and sleepy end devices.

The block diagram of the ZIGBEE® device 100 may be similar to the gateway device 10 when configured in standalone mode. However, in certain embodiments, the ZIGBEE® device 100 does not have a second network interface 50. In other words, the ZIBBEE® device 100 may have only a single network interface which is used to communicate over the ZIGBEE® network to the gateway device 10 and other ZIGBEE® devices.

The gateway device 10 is also in communication with the internet. If in standalone mode, the gateway device 10 communicates to other devices via second network interface 50. While in standalone mode, in certain embodiments, the gateway device 10 may be in communication with the internet via the local computer 151. Additionally, the gateway device 10 may utilize the local computer 151 to perform other functions, such as data processing as described in more detail below.

If in NCP mode, the gateway device 10 communicates with other devices via the host computer 51. In this mode, the host computer 51 may comprise antenna 55 or a wired connection.

There may be one or more servers disposed in the cloud 150 that may be accessed, either directly or indirectly, by the gateway device 10. Cloud computing offers the infrastructure to share resources, collect data and analyze data through the internet.

Cloud computing offers a depository for large amounts of data to be stored. It also provides global access to multiple users, a reliable place to recover data that could be lost and an economical storage of resources. Other benefits include the ability to use multiple machines to read and analyze big data sets instead of the conventional method of analyzing large amounts of data using a single machine.

The cloud services may be provided in a number of ways. For example, the servers may be hosted by a third party, or may be provided by the same party as the gateway device 10. Additionally, other devices may be able to access the cloud 150, such as smart phone 160 and remote computing device 170.

Figure 3:
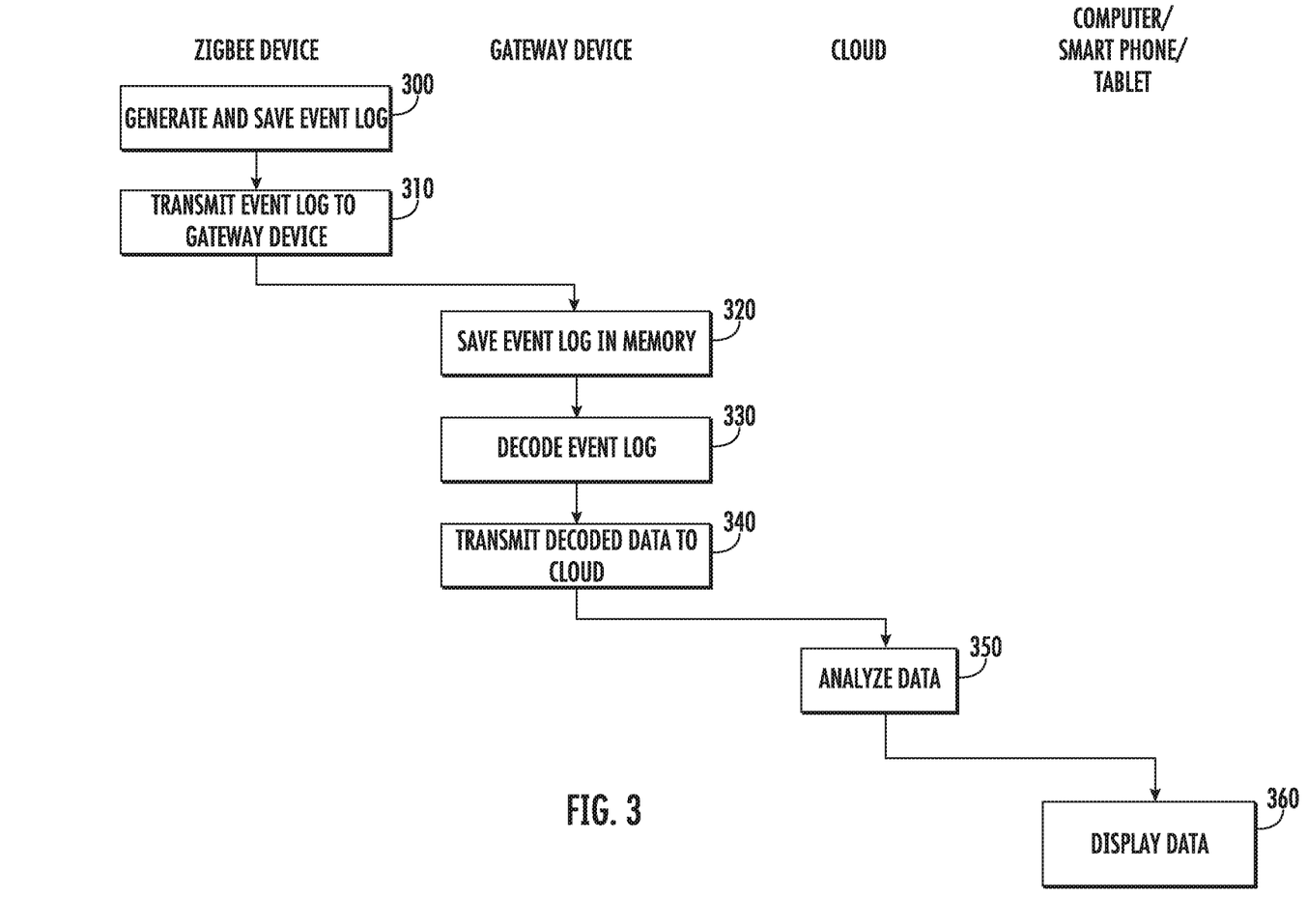
FIG. 3 illustrates a flowchart showing the overall operation of the Zigbee® device and the gateway device according to one embodiment.

The gateway device 10, either directly or indirectly through local computer 151 (in standalone mode) or through host computer 51 (in NCP mode), may be used to move data from each ZIGBEE® device 100 to the cloud 150, where it can be analyzed and retrieved by remote devices, such as smart phone 160 and remote computing device 170. FIG. 3 shows a sequence that may be used to perform this function.

In one embodiment, as shown in Box 300, the ZIGBEE® Device 100 maintains a log of network events of interest. These events may include:

Reboot—the ZIGBEE® device restarted due to a power failure or exception error, for example;
Join network—the ZIGBEE® device has joined a ZIG-BEE® network;
Leave network—the ZIGBEE® device has left a ZIG-BEE® network;
Trust center link key exchange—the ZIGBEE® device has received a link key from the trust center;
Channel change—the ZIBGEE® device starts transmitting on a different channel;
Parent change—the ZIGBEE® device acquires a different parent node;
Child added—a new device uses this ZIGBEE® device as its parent;
Child removed—a device no longer uses this ZIGBEE® device as its parent;
Network Security parameter changes—the ZIGBEE® device detects changes to the network wide security key or sequence number.

The ZIGBEE® device 100 may store these events in a predetermined format. For example, the format may include the time of the event. This may be stored in Coordinated Universal Time (UTC) format. The format may also include an additional optional field that stores millisecond precision of the time. Further, the format may include an identifier for each entry. Lastly, the format may include data associated with the event. This field may be variable in length.

In certain embodiments, the ZIGBEE® device 100 may designate a part of its memory (either memory device 25 or second memory device 40) for storing these event logs. To limit the amount of storage that is allocated to these event logs, the ZIGBEE® device 100 may create a ring buffer where a fixed number of event logs may be stored. For example, the ZIGBEE® device 100 may create a ring buffer that is capable of storing 5 event logs. When the sixth event is to be stored, the ZIGBEE® device 100 overwrites the oldest event log.

The number of event logs that can be stored in the memory of the ZIGBEE® device 100 may be an implementation specific decision and the number is not limited by this disclosure.

In certain embodiments, the event logs may be stored in a rewritten non-volatile memory device such that the information is not lost in the event of a power loss or reset.

The ZIGBEE® device 100 may transmit one or more event logs to the gateway device 10, as shown in Box 310. In one embodiment, these event logs are sent immediately after they are stored by the ZIGBEE® device 100. In another embodiment, these event logs are transmitted after the number of unsent event logs reaches a predetermined value. For example, the ZIGBEE® device 100 may transmit the event logs once there are four unsent event logs. This may ensure that event logs are not inadvertently lost or overwritten, while minimizing traffic on the ZIGBEE® network.

Figure 4:
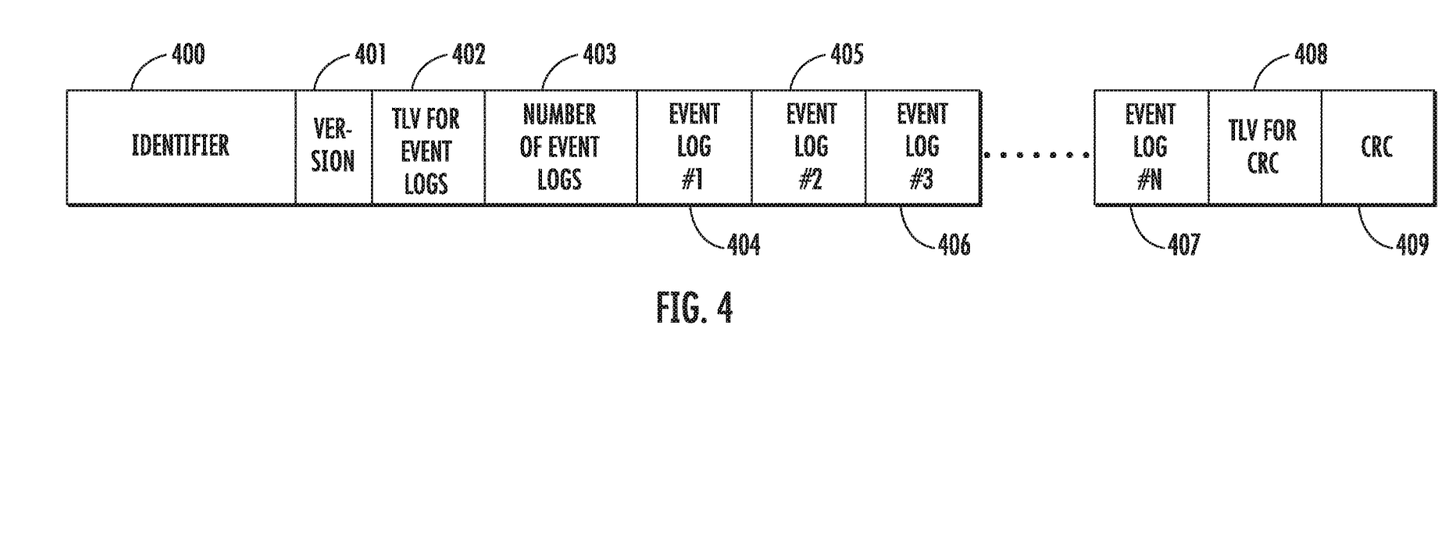
FIG. 4 shows a representative packet used to transmit event logs to the gateway device.

In some embodiments, the event logs are transmitted using a special format. For example, a vendor unique packet having a special packet format may be used. This special format may be referred to as a Diagnostic Information Data Object or DIDO. The format of the DIDO packet may be as shown in FIG. 4. For example, a packet may begin with a special unique code, or an identifier 400 that the message is indeed an event log, that identifies this special format. Following the identifier 400 may be a version number 401. Lastly, the format contains a sequence of TLV (type-length-value) fields. There may be a plurality of different types. One type may be used to designate event logs. Another type may be used to designate a CRC or checksum. The TLV that designates the CRC may be the last TLV in the DIDO packet. In FIG. 4, there is a TLV 402 for event logs. This is followed by a field 403 that represents the number of event logs that are being transmitted. Event log #1 404, event log #2 405, and event log #3 406 may follow field 403. In some embodiments, more or fewer event logs may be transmitted in the DIDO packet. Next, the TLV for CRC 408 follows the last event log. Lastly, the CRC 409 terminates the packet. The CRC 409 may provide an integrity check of the entire DIDO packet.

In this way, the Zigbee® device 100 may transmit a plurality of event logs in one packet, thereby saving bandwidth and power consumption. For example, as shown in FIG. 4, the DIDO packet may indicate that there are N event logs, followed by a single CRC.

These event logs are then stored in the gateway device 10, as shown in Box 320. For example, the event logs may be stored in the file system of the gateway device 10 or the host computer 51 (if the gateway device 10 operates in NCP mode). In one embodiment, the event logs from each ZIG-BEE® device 100 are maintained separately. In another embodiment, the event logs from multiple ZIGBEE® devices 100 are interleaved, such as in chronological order giving a comprehensive view of ZIGBEE® events in occurring in the network. In certain embodiments, the event logs are stored in the format in which they were received from the ZIGBEE® devices 100 or translated into standard log formats, such as syslog. Once logs have been received by the gateway device 10, the ZIGBEE® device 100 may reclaim the resources used by those event logs.

As shown in Box 330, the event logs may be decoded into plain text that can be easily analyzed. For example, the decoder, which may be a software program, may interpret a particular field within the event log packet to determine which type of event occurred. Additionally, the decoder may introduce text headers for each field in the event log. For example, the decoder may decode the event log and include headers for id number, length, data, message content, and time of event. Thus, the decoder may be used to convert the event logs into a human readable format.

If the gateway device 10 is in NCP mode, the host computer 51 may implement at least a portion of the decoder. Alternatively, the processing unit 20 may perform the decoding.

If the gateway device 10 is in standalone mode, the decoding may be performed by processing unit 20. However, in other embodiments, the gateway device 10 may forward the event logs to local computer 151. Local computer 151 may then perform the decoding described above.

In other words, the decoding of the event log may be performed by the processing unit 20, the host computer 51 or the local computer 151.

In one embodiment, a YAML format is created for the event logs and a software program is used to interpret the set of event logs using the YAML structure into human readable form. In one embodiment, this software program may be a JAVA object model. The YAML format may be stored separately or may be contained as part of the log file. In other embodiments, formats other than YAML may be utilized. For example, in certain embodiments, JSON may be used.

As shown in Box 340, the data is then transmitted from the gateway device 10 to a server in the cloud 150. This may be done using a tool kit supplied by the cloud provider, such as AWS toolkit for Eclipse for Amazon Web Services, or a similar tool kit supplied by Google Cloud or Microsoft Azure.

If, as described above, the gateway device 10 is in standalone mode and forwarded the event logs to the local computer 151, the local computer 151 may then transmit the data to a server in the cloud 150.

If the gateway device 10 is in NCP mode, the host computer 51 may transmit the data to the server in the cloud 150.

Once the data has been uploaded to the cloud 150, it is available for further analysis, as shown in Box 350. This analysis may be performed on the server in the cloud 150.

The results of this analysis can then be retrieved and displayed by other devices, such as smart phone 160 and remote computing device 170, as shown in Box 360.

It is noted that the sequence shown in FIG. 3 may be modified. For example, the decoding of the event logs (Box 330) may take place after transmission (Box 340) such that the decoding is performed in the cloud 150. This may minimize the amount of traffic that is transmitted from the gateway device 10 to the cloud 150. It may also minimize the processing that is done by the gateway device 10. In another embodiment, the decoding (Box 330) may take place before the storage of the event logs (Box 320), such that the decoded data is stored in the gateway device 10 and is available to a local system administrator. Both approaches may facilitate the creation of a single list of event logs from various Zigbee® devices that are arranged chronologically giving a holistic view of the network behavior.

Figure 5:
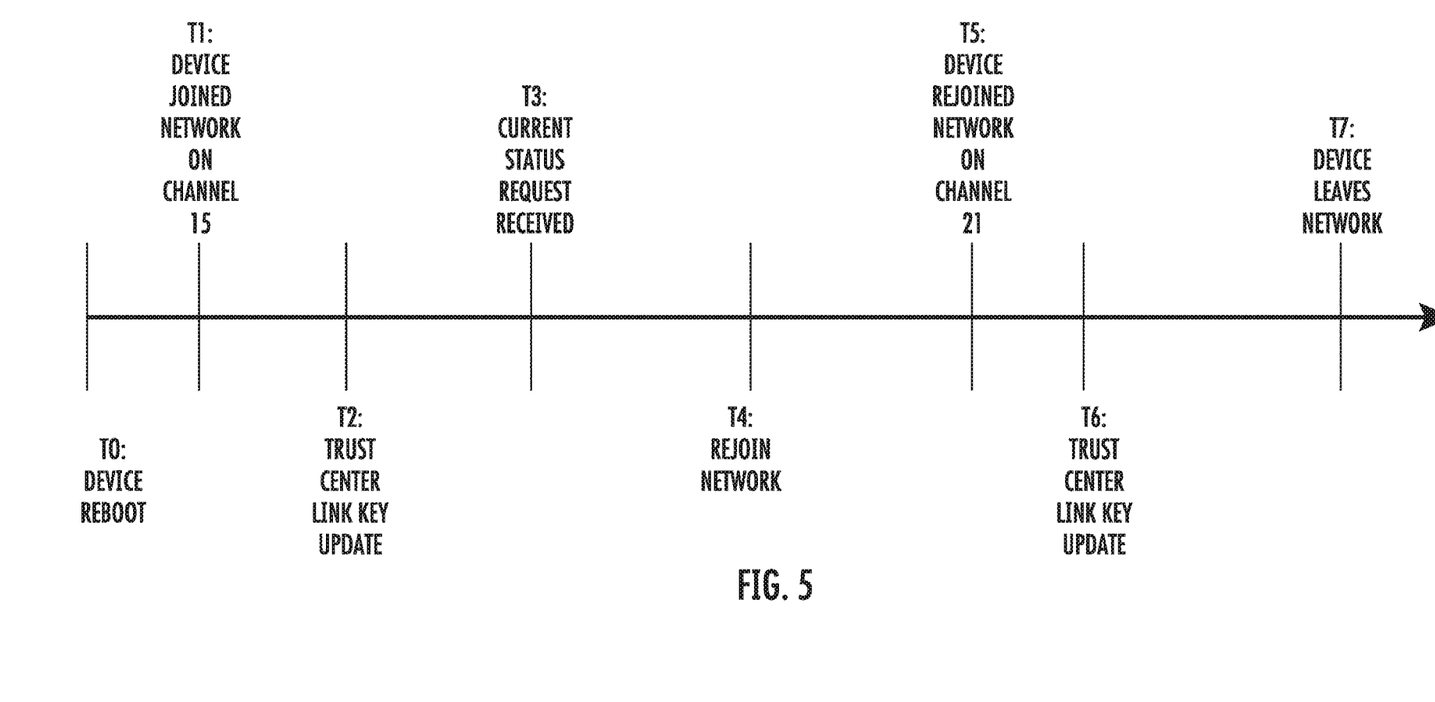
FIG. 5 shows a timeline of events for a ZIGBEE® device that can be monitored from the cloud.

Thus, using this approach, it is possible to remotely monitor a ZIGBEE® network. FIG. 5 shows a representative timeline that may be created using the method shown in FIG. 3. Note that this figure represents the activities of one ZIGBEE® device 100 on the ZIGBEE® network. Similar timelines may be created for each ZIGBEE® device on the network. FIG. 5 shows that the ZIGBEE® device 100 rebooted at time T0. At time T1, the ZIGBEE® device 100 joined the network on channel 15. Later, at time T2, there was a link key exchange with the trust center. At time T3, the ZIGBEE® device 100 was asked for its current status. This may be due to the fact that the ZIGBEE® device failed to respond to one or more messages. For example, the ZIGBEE® device 100 may have experienced a power outage or may have a weak connection with a parent ZIGBEE® device. At time T4, the ZIGBEE® device 100 rejoins the network. The rejoin could have been necessary due to a weak connection with another ZIGBEE® device. Alternatively, this could be due to a previous power outage by the ZIGBEE® device 100. At time T5, the ZIGBEE® device 100 joined the network on channel 21. Later, at time T6, there was a link key exchange with the trust center. Finally, at time T7, the ZIGBEE® device 100 left the network.

A single rejoin by the ZIGBEE® device 100 at time T4 in isolation may be an uninteresting event. As noted above, this could be due to a power outage. However, with this mechanism, other devices in the network can be monitored for similar behavior. It could be that many nodes also rejoined at or around time T4. This activity signals the loss of a critical node in the network. This knowledge can be used to identify unreliable nodes and take action, such as, for example, to replace them.

While the present disclosure describes the gateway device 10 as part of a ZIGBEE® network, it is understood that this disclosure is also applicable to other wireless networks, such as Z-Wave, Bluetooth, Thread and others.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of remotely monitoring a network device disposed on a wireless network, comprising:
storing, at the network device, an event log, wherein the event log is stored when the network device performs an action selected from the group consisting of: Reboot, Join network, Leave network, Trust center link key exchange, Channel change, Parent change, Child added, Child removed, and Network Security parameter changes;

transmitting the event log from the network device to a gateway device;
receiving the event log at the gateway device;
decoding the event log to create a human readable output;
uploading the human readable output to a server in a cloud; and
using a remote device in communication with the server, to access the human readable output.

2. The method of claim 1, wherein the server in the cloud performs analysis on the human readable output and makes a result of this analysis available to the remote device.

3. The method of claim 1, wherein the wireless network comprises a ZIGBEE® network.

4. The method of claim 3, wherein the event log is transmitted in a vendor unique packet having a special packet format referred to as a Diagnostic Information Data Object (DIDO) packet.

5. The method of claim 4, wherein a plurality of event logs are transmitted in the DIDO packet.

6. The method of claim 1, wherein the gateway device is in Network coprocessor (NCP) mode, wherein the gateway device is a network coprocessor in communication with a host computer, wherein the host computer decodes the event log and uploads the human readable output to the server.

7. The method of claim 1, wherein the gateway device is in standalone mode, wherein the gateway device transmits the event log to a local computer via a network interface different from a network interface used to receive the event log.

8. The method of claim 7, wherein the local computer decodes the event log.

9. The method of claim 8, wherein the local computer uploads the human readable output to the server.

10. The method of claim 1, wherein the network device stores the event log in a ring buffer disposed in a memory device prior to transmitting to the gateway device.

11. A method of remotely monitoring a network device disposed on a wireless network, comprising:
storing, at the network device, an event log, wherein the event log is stored when the network device performs an action selected from the group consisting of: Reboot, Join network, Leave network, Trust center link key exchange, Channel change, Parent change, Child added, Child removed, and Network Security parameter changes;
transmitting the event log from the network device to a gateway device;
receiving the event log at the gateway device;
uploading the event log to a server in a cloud;
decoding the event log at the server in the cloud to create a human readable output; and
using a remote device in communication with the server, to access the human readable output.

12. The method of claim 11, wherein the server in the cloud performs analysis on the human readable output and makes a result of this analysis available to the remote device.

13. The method of claim 11, wherein the wireless network comprises a ZIGBEE® network.

14. The method of claim 13, wherein the event log is transmitted in a vendor unique packet having a special packet format referred to as a Diagnostic Information Data Object (DIDO) packet.

15. The method of claim 14, wherein a plurality of event logs are transmitted in the DIDO packet.

16. A gateway device, comprising:
a first network interface to communicate with one or more ZIGBEE® devices;
a second network interface to communicate over internet;
one or more processing units;
one or more memory devices in communication with the one or more processing units;
wherein the one or more memory devices comprise instructions, which when executed by the one or more processing units, enable the gateway device to:
receive, using the first network interface, an event log from one or more ZIGBEE® devices;
decode the event log to create a human readable output; and
upload the human readable output to a server in a cloud.

17. The gateway device of claim 16, wherein the gateway device operates in Network coprocessor (NCP) mode, such that a host computer is in communication with one of the one or more processing units, and wherein the host computer decodes the event log and uploads the human readable output to the server.

18. The gateway device of claim 16, wherein the gateway device operates in standalone mode, and the gateway device uploads the human readable output to the server using the second network interface.

* * * * *